United States Patent
Hayashi

(10) Patent No.: US 6,375,184 B1
(45) Date of Patent: Apr. 23, 2002

(54) SHEET CONVEYING APPARATUS AND IMAGE FORMING APPARATUS

(75) Inventor: Isao Hayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,698

(22) Filed: Jul. 28, 2000

(30) Foreign Application Priority Data

Jul. 30, 1999 (JP) ............................................ 11-216666

(51) Int. Cl.[7] ............................. B65H 3/16; B65G 15/00
(52) U.S. Cl. ................... 271/18.1; 271/193; 198/472.1; 198/691; 198/803.6
(58) Field of Search ............................. 198/472.1, 691, 198/803.6; 221/18.1, 193

(56) References Cited

U.S. PATENT DOCUMENTS 4,244,465 A * 1/1981 Hishikawa et al. ......... 198/691
5,821,968 A * 10/1998 Ohyama et al. .......... 347/104 X
6,164,761 A * 12/2000 Numata .................... 347/55 X

FOREIGN PATENT DOCUMENTS

| JP | 4-72236 A | * | 3/1992 | ............ B65H/3/18 |
| JP | 6-255823 A | * | 9/1994 | ............ B65H/5/00 |

* cited by examiner

Primary Examiner—Christopher P. Ellis
Assistant Examiner—Kenneth W Bower
(74) Attorney, Agent, or Firm—Fitzpatrick, Cella, Harper & Scinto

(57) ABSTRACT

The present invention relates to a sheet conveying apparatus comprising a conveyance belt, on which stripe shaped electrodes each fed to a voltage different from that fed to one another are alternatively arranged, for conveying a sheet in attracting the sheet with electrostatic force and power supplying means disposed on an inner side of the conveyance belt for supplying voltage to the electrodes.

5 Claims, 7 Drawing Sheets

SHEET CONVEYING APPARATUS AND IMAGE FORMING APPARATUS

BACKGROUND OF THE INVENTION

1. Field of the Invention

This invention relates to a sheet conveying apparatus for conveying sheets in attracting the sheets with electrostatic force and an image forming apparatus having this apparatus.

2. Description of Related Art

As inkjet recording apparatuses advance printing faster these days, a conveying method (electrostatically attracting conveyance method) in use of a conveyance belt having electrodes has been used as a conveyance method for recording media such as paper and plastic sheets.

Referring to drawings, a conventional inkjet recording apparatus having a sheet conveying apparatus of an electrostatic attraction method is described. FIG. 5 is a schematic structural view showing a conventional image forming apparatus; FIG. 6 is a plan view showing a sheet conveying apparatus; FIG. 7 is a front view showing a recording means and the vicinity thereof. The image forming apparatus 50 shown in FIG. 5 includes a recording head 51 for rendering image recording, and a conveyance belt 52 serving as a sheet conveying apparatus adapted for the electrostatic attraction method. The recording head 51 is a liner type having orifices arrayed in a width substantially equal to the sheet width of the sheet to be conveyed and can form images at a high speed in comparison with a recording head of a serial type in which the recording head is mounted on a carriage for scanning movement.

Images may be improperly formed when the head comes in contact with the recording surface to keep the sheet while the sprayed ink is not yet settled right after recording because of high-speed printing. To cope with such a problem, such an apparatus is so designed that a back side opposite to the recording side of the sheet is attracted to the conveyance belt 52 having electrostatically attracting means to convey the sheet without contacting the recording side.

The conveyance belt 52 is an annular stripe shaped member and is wound around a drive roller 58 and a supporting roller 59, thereby conveying sheets by rotatively driving. The electrostatically attracting means is constituted of an electrode group (hereinafter referred to as "comb-shaped electrodes 53, 54"), placed alternatively in a stripe shape as shown in, e.g., FIG. 6, to which different voltages are fed, and conducting blushes 55, 56 on both ends as power supplying means for the conveyance belt 52.

With such a structure, attraction force can be given where one end of the comb-shaped electrodes 53, 54 is connected to the ground level (0 kV) and where the other end is biased to a predetermined voltage (e.g., 3 kV) to create a voltage difference. A surface protection layer 57 is formed on the comb-shaped electrodes 53, 54 as shown in FIG. 7. The conveyance belt 52 while attracting the sheet rotates to convey the sheet, thereby rendering image recording by spraying ink droplets 51a from the recording head 51.

The conventional apparatus, however, requires portions (land portions) to contact the comb-shaped electrodes 53, 54 with the conducting blushes 55, 56 on opposite ends of the sheet in the width direction, and therefore, the conveyance belt 52 has to be formed prescribed size wider than the sheet width. In case where paper jamming occurs under the recording head 51, the conducting blush 55 may interfere with removal of the sheet or sheets and may lower the workability.

It is an object of the invention to provide a compact image forming apparatus which can be recovered from paper jamming or the like with improved workability by changing the arranging method of a power supplying means.

SUMMARY OF THE INVENTION

To solve the above problems, a sheet conveying apparatus according to the invention has a structure that including a conveyance belt, on which plural electrodes each fed to a voltage different from that fed to one another are arranged, for conveying a sheet in attracting the sheet with electrostatic force; and power supplying means disposed on an inner side of the conveyance belt for supplying voltage to the electrodes.

According to the structure thus described, because the power supplying means is disposed on an inner side of the conveyance belt, the sheet conveying apparatus can be made compact in comparison with a conventional apparatus that requires to ensure a space for placing the power supplying means on the exterior surface side of the conveyance belt, or namely on an upper side. When a sheet or sheets are removed from the surface of the conveyance belt during paper jamming recovery, the power supplying apparatus does not interfere with the recovery work, so that the workability for such recovery can be improved.

DETAILED DESCRIPTION OF THE PREFERRED EMBODIMENTS

Figure 1:
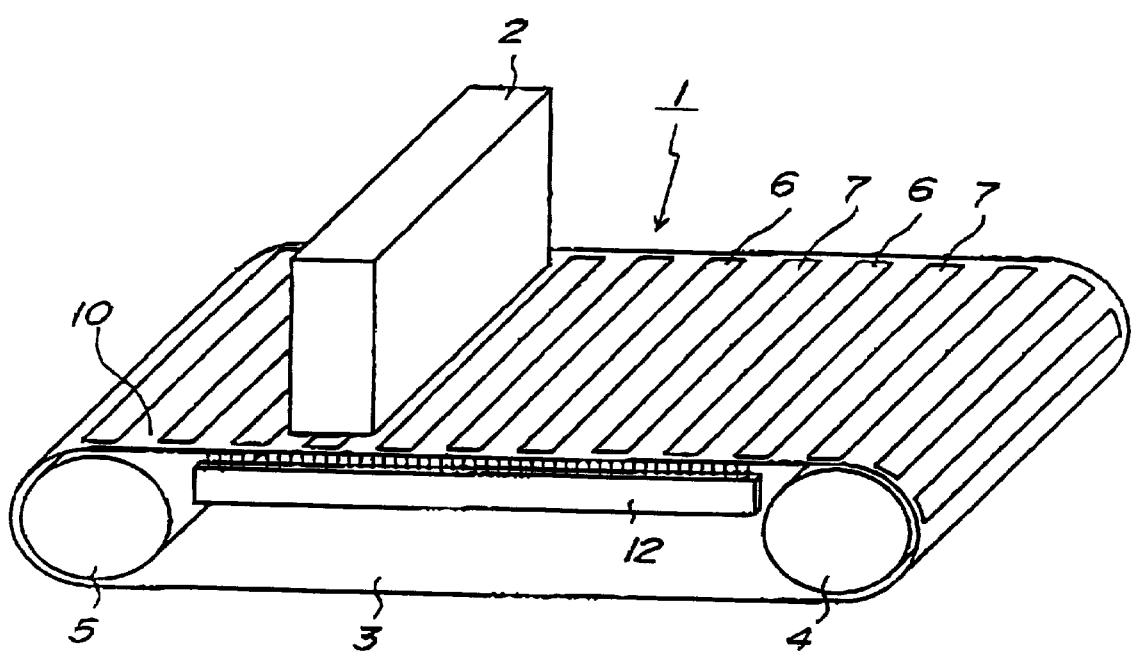
FIG. 1 is a schematic structural view for describing an essential portion of an image forming apparatus according to the first embodiment.
Figure 2:
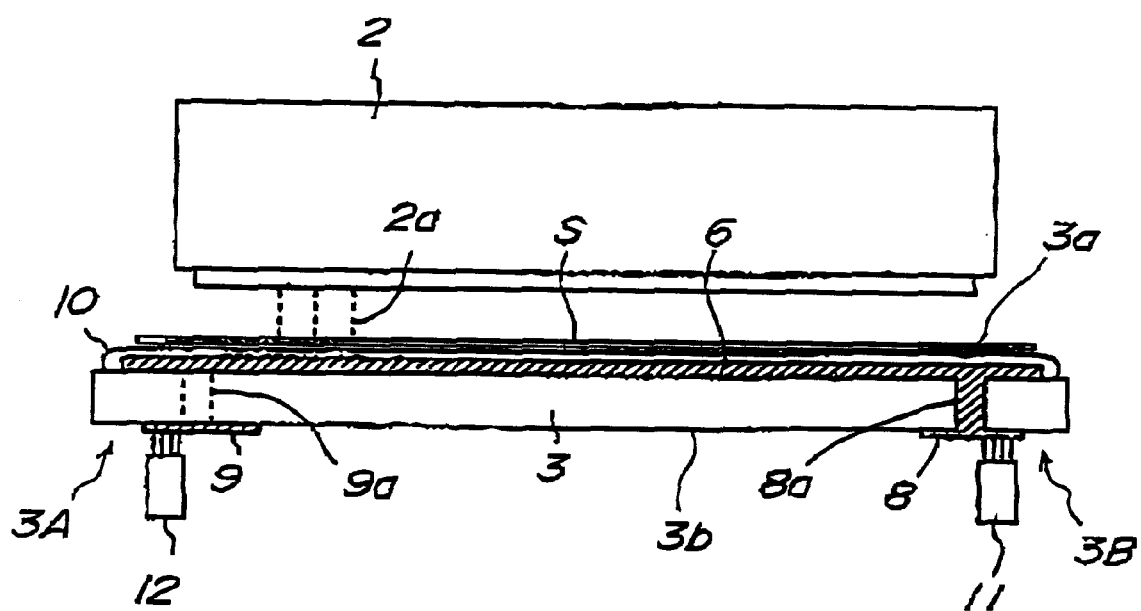
FIG. 2 is a cross section showing a sheet conveying apparatus according to the first embodiment.

Referring to the drawings, an embodiment of a sheet conveying apparatus and an image forming apparatus according to the invention is described. FIG. 1 is a schematic structural view for describing an essential portion of an image forming apparatus according to this embodiment; FIG. 2 is a cross section showing a sheet conveying apparatus according to this embodiment.

The image forming apparatus 1 shown in FIG. 1 includes a recording head 2 for image recording, and a conveyance belt 3 serving as a sheet conveying apparatus adapted for electrostatic attraction method. The recording head 2 is adapted for inkjet recording method of a linear type in which orifices are arrayed across a width substantially equal to the sheet width to be conveyed. The conveyance belt 3 is an annular stripe member wound around a drive roller 4 and a support roller 5 and conveys the sheets by rotational drive. This conveyance belt 3 is formed with electrode groups (hereinafter referred to as "comb-shaped electrodes 6, 7") having stripe shaped electrodes placed alternatively to which different voltages are fed and serving as an electrostatically attracting means.

The comb-shaped electrodes 6, 7 serving as first and second electrodes, respectively, as shown in FIG. 2, are disposed on an exterior surface 3*a* of the conveyance belt 3. The comb-shaped electrodes 6, 7 are electrically connected to land portions 8, 9 located on an interior surface 3*b* of the conveyance belt 3 via through holes 8*a*, 9*a* formed having a diameter of several millimeters in the conveyance belt 3. Conducting blushes 11, 12 serving as the first power supplying means and the second power supplying means are disposed as to contact with the first and second land portions 8, 9, one of which is fed to the ground level (e.g., 0 kV), and the other of which is fed to a high voltage (e.g., 3 kV).

With this structure, as different from the conventional apparatus described above, the comb-shaped electrodes 6 (i.e. first electrode) fed to the ground level and the comb-shaped electrodes 7 (i.e., second electrode) fed to a prescribed voltage have the same length and each end located at substantially the same position from the end of the conveyance belt 3 in the width direction of the conveyance belt 3. Consequently, the exterior surface of the conveyance belt 3 can be formed with the electrodes in a wide area, so that the entire surface can be used for the conveyance region for sheets.

Meanwhile, the first land portions 8 and the second land portions 9 disposed on the interior surface of the conveyance belt 3 are mounted to a first position closer to one end 3A and to a second position closer to the other end 3B, respectively, in the width direction of the conveyance belt 3. The conducting blush 11 as a first power supplying means is placed corresponding to the first position, and the conducting blush 12 as a second power supplying means is placed corresponding to the second position.

With this structure, electrostatic force occurs between the comb-shaped electrodes 6, 7. When a sheet reaches the power supplied portion, the sheet is polarized by the electric field created between the electrodes, thereby producing electrostatic force attracting each other, and thereby attracting the sheet to the conveyance belt 3. A surface protection layer 10 is formed on the surfaces of the comb-shaped electrodes 6, 7. The sheet is conveyed by rotation of the conveyance belt 3 while the sheet is attracted and attached, and images are recorded by spraying ink droplets 2*a* from the recording head 2.

Figure 7:
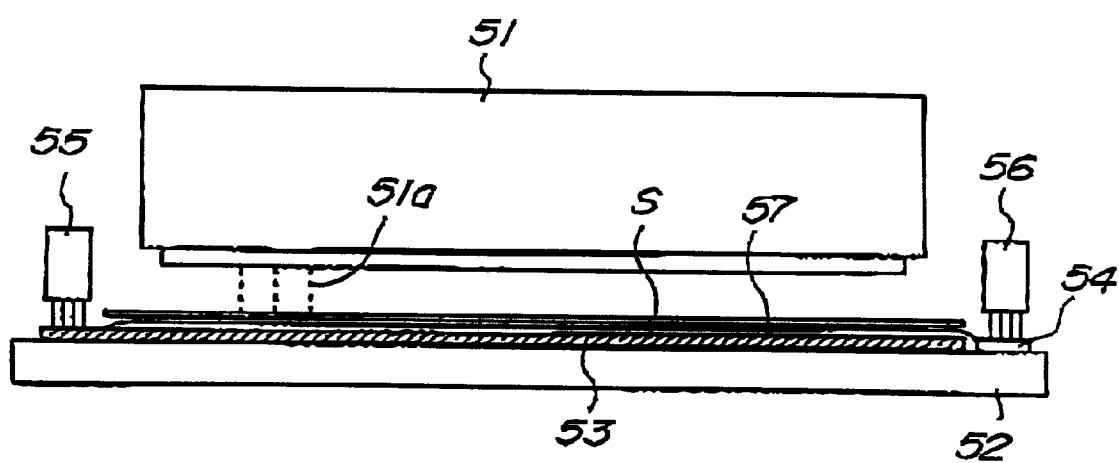
FIG. 7 is a front view of a recording means and the vicinity thereof.

According to the structure thus described, although a conventional conveyance belt requires a width for installation of the conducting blushes 55, 56 (FIG. 7) in addition to the width of the sheet S, the conveyance belt 3 can be formed with a width substantially equal to the maximum sheet width in this embodiment because the conducting blushes 11, 12 can be disposed in a space on an inner side of the conveyance belt 3. Therefore, the space required for the conveyance belt 3 can be greatly made smaller, so that the conveyance belt 3, the drive roller 4, the support roller 5, and so on can be made compact.

When paper jamming occurs on the conveyance belt 3, the operator can smoothly remove the jammed paper without being disturbed from the conducting blushes 11, 12 because the conducting blushes 11, 12 are disposed below the conveyance belt 3. When ink leakage occurs from the recording head 2, the conducting blushes 11, 12 are not affected from the leakage, and furthermore, the hairs coming out of the blushes will not interfere with recording images.

Figure 3:
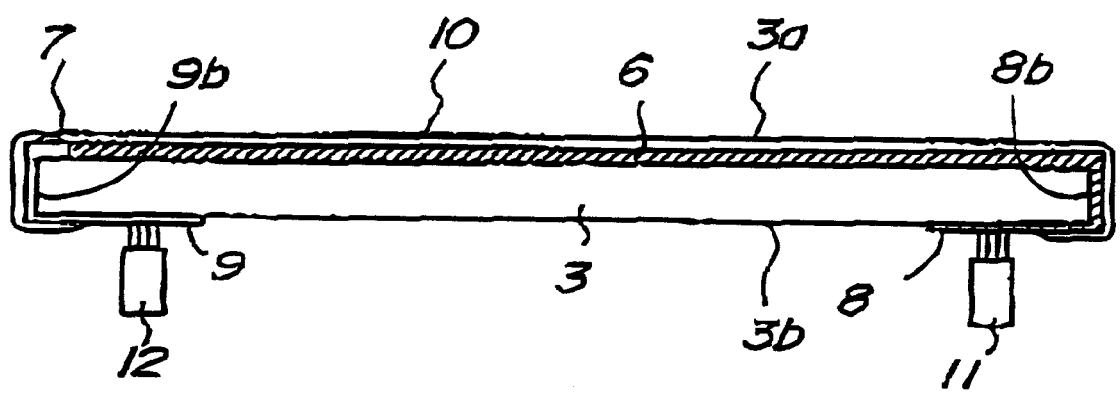
FIG. 3 is a cross section showing a sheet conveying apparatus according to a second embodiment.
Figure 4:
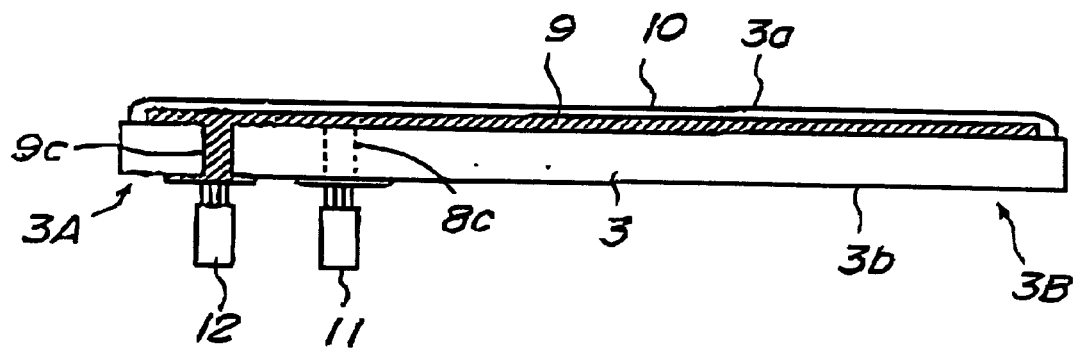
FIG. 4 is a cross section showing a sheet conveying apparatus according to a third embodiment.
Figure 5:
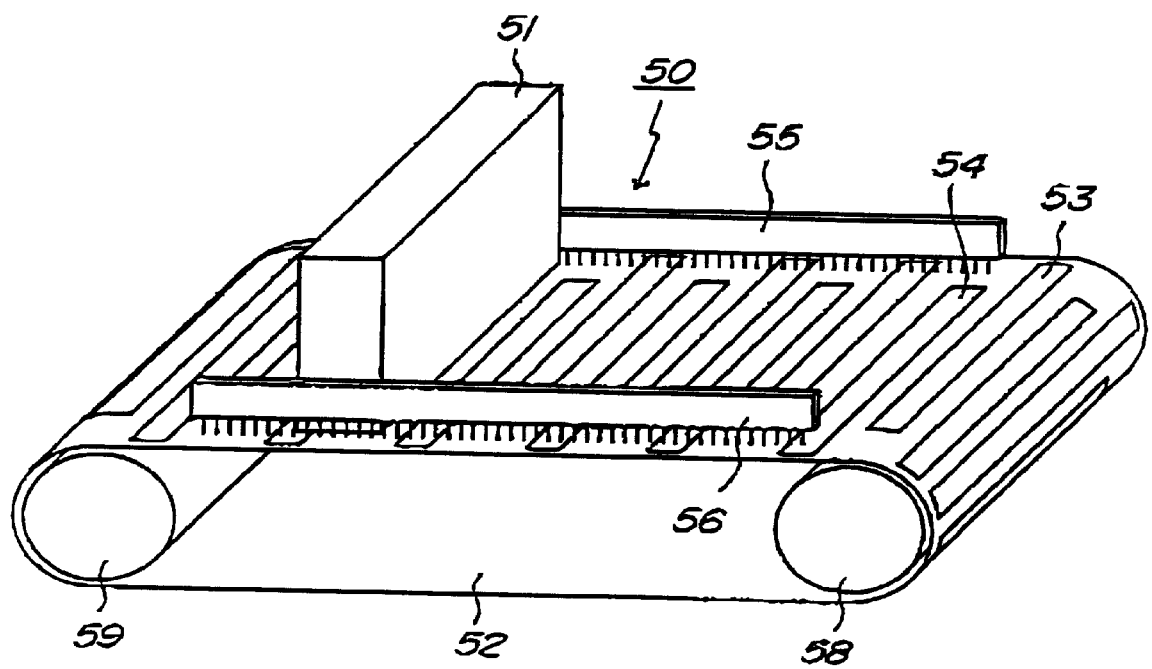
FIG. 5 is a schematic structural view showing a conventional image forming apparatus.
Figure 6:
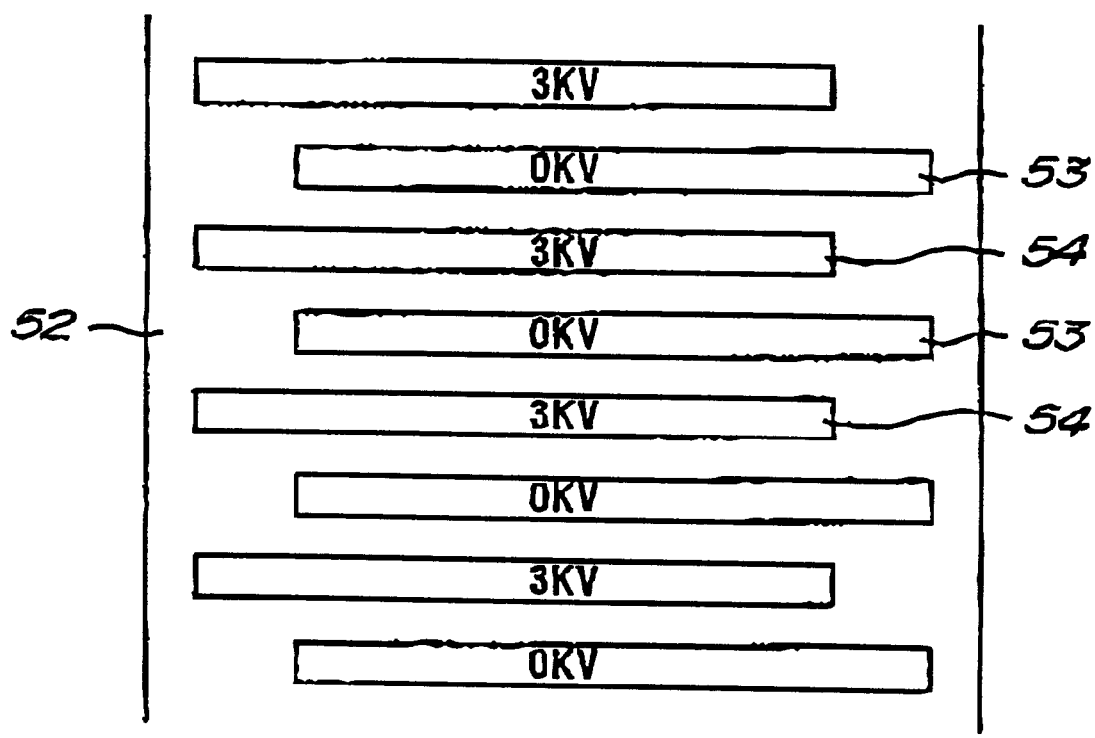
FIG. 6 is a plan view of a conventional sheet conveying apparatus.

It is to be noted that although in this embodiment through holes 8*a*, 9*a* are formed as a conducting means between the comb-shaped electrodes 6, 7 located on the exterior side of the conveyance belt 3 and the land portions 8, 9 located on the interior side, this invention is not limited to this structure. FIG. 3 and FIG. 4 show second and third embodiments of sheet conveying apparatuses and image forming apparatuses according to the invention. Portions illustrated as the same as the above embodiment are indicated with the same reference numbers, and detailed descriptions are omitted.

FIG. 3 shows the second embodiment. In this embodiment, no through hole is formed, and land portions 8, 9 are formed in extending along the side end of the conveyance belt 3. That is, as a conducting method between the comb-shaped electrodes 6, 7 and the land portions 8, 9, electrodes 8*b*, 9*b* are extending along the end of the conveyance belt 3 and up to the interior surface of the conveyance belt 3 to connect with the land portions 8, 9. With this structure, the structure can be made simply more than the structure with the through holes, and the production can be made easily.

FIG. 4 shows the third embodiment. In this embodiment, the through holes 8*c*, 9*c* are disposed closer to one end 3A in the width direction of the conveyance belt 3. The conducting blushes 11, 12 are also disposed closer to one end 3A in the width direction of the conveyance belt 3 as corresponding to the through holes, so that the space efficiency can be further improved. Where the other end 3B of the conveyance belt 3 is used as an access side for paper jamming recovery, the operator can work at a position remote from the conducting blushes 11, 12, and the workability can be further improved since the conducting blushes 11, 12 do not interfere with recovery.

As described above, the sheet conveying apparatus and the image recording apparatus according to the invention can bring a smaller apparatus size and good workability of paper jamming recovery or the like from the structure that the power supply is made from the interior side of the conveyance belt.

What is claimed is:

1. A recording apparatus for recording on a recording medium conveyed on and attracted to a conveying belt wound around two rollers, comprising:

recording means disposed to face an outer surface of the conveying belt at a position between the two rollers;

a plurality of electrodes disposed on the outer surface of the conveying belt, each electrode of said plurality of electrodes being electrically independent to each other;

a plurality of receiving portions disposed on an inner surface of the conveying belt respectively corresponding to said each of said plurality of electrodes, said plurality of receiving portions for receiving an electric power supply for the plurality of electrodes;

an electric power supplying member disposed on the inner side of the conveying belt in contact with the plurality of receiving portions; and conductive passages connecting each electrode to the corresponding receiving portion, each conductive passage for supplying a single electrode with electric power supplied from the electric supplying member via the corresponding receiving portion.

2. A recording apparatus according to claim 1, wherein each of said conductive passages connects the electrode to the corresponding receiving portion by one of perforating between the outer surface and the inner surface of the conveying belt and detouring along an edge of the conveying belt.

3. A recording apparatus according to claim 1, wherein the electric power supplying member simultaneously supplies electric power to plural receiving portions in an attracting area formed on the conveying belt.

4. A recording apparatus according to claim 1, wherein the receiving portion is disposed on one edge side of the conveying belt.

5. A recording apparatus according to one of claim 1 to 4, wherein the recording means is ink-jet recording means which discharged ink from a recording head thereof.

* * * * *